United States Patent
Dadon et al.

(10) Patent No.: US 11,930,048 B1
(45) Date of Patent: Mar. 12, 2024

(54) TESTING COMPLEX DECISION SYSTEMS USING OUTCOME LEARNING-BASED MACHINE LEARNING MODELS

(71) Applicant: INTUIT INC., Mountain View, CA (US)

(72) Inventors: Asher Asaf Dadon, Pardes-Hanna (IL); Benjamin Cates, Zichron Yaakov (IL); Limor Ikar, Hadera (IL); Elhanan Mishraky, Nofim (IL); Tsofit Efroni Zazon, Kadima Tzoran (IL)

(73) Assignee: Intuit, Inc., Mountain View, CA (US)

( * ) Notice: Subject to any disclaimer, the term of this patent is extended or adjusted under 35 U.S.C. 154(b) by 0 days.

(21) Appl. No.: 18/362,572

(22) Filed: Jul. 31, 2023

(51) Int. Cl.
    *H04L 9/40* (2022.01)
(52) U.S. Cl.
    CPC ............ *H04L 63/205* (2013.01); *H04L 63/10* (2013.01); *H04L 63/1425* (2013.01)
(58) Field of Classification Search
    CPC .................................................. H04L 63/1433
    See application file for complete search history.

(56) References Cited

U.S. PATENT DOCUMENTS

| | | | | |
|---|---|---|---|---|
| 10,176,320 B1 * | 1/2019 | McMurdie | ......... | G06Q 10/0635 |
| 2007/0011319 A1 * | 1/2007 | McClure | ................ | H04L 41/12 709/224 |
| 2018/0351991 A1 * | 12/2018 | Jones | .................. | H04L 63/1425 |
| 2018/0367561 A1 * | 12/2018 | Givental | ............... | G06F 21/552 |
| 2021/0075794 A1 * | 3/2021 | Gazit | .................. | H04L 63/1408 |
| 2021/0133331 A1 * | 5/2021 | Lipkis | ................. | H04L 63/1483 |
| 2021/0312441 A1 * | 10/2021 | Dawson | .................. | H04L 63/20 |
| 2022/0198322 A1 * | 6/2022 | Kuperman | .......... | H04L 63/1441 |
| 2022/0311797 A1 * | 9/2022 | Shavlik | ............... | H04L 63/1433 |

* cited by examiner

*Primary Examiner* — Khang Do (74) *Attorney, Agent, or Firm* — Patterson + Sheridan, LLP (57) ABSTRACT

Certain aspects of the present disclosure provide techniques for adjusting access control policies of access controlled systems, such as techniques for identifying a vulnerability or for identifying parameters and values achieving a specified result from a system whose access is controlled by the policy. Requests to the system can be made using a testing system that executes test scripts using avatars having various parameter types and values. The avatar information and results of the test scripts are provided as training data to a machine learning model training system to generate a model that provides recommendations for parameter types and values likely to achieve a particular result. The recommendations are used to execute the test script to determine results including a rate of success for the recommended parameters and/or values. Various actions, such as adjusting or adding a rule to an access control policy, can be performed based on the results.

13 Claims, 5 Drawing Sheets

TESTING COMPLEX DECISION SYSTEMS USING OUTCOME LEARNING-BASED MACHINE LEARNING MODELS

INTRODUCTION

Aspects of the present disclosure relate to testing complex decision systems using machine learning models.

BACKGROUND

Complex decision systems are used in a variety of applications to make decisions regarding an outcome based on various conditions. Various types of complex decision systems can also include access control systems to restrict unauthorized or unapproved access to portions of physical or digital systems. Resources, information, or other features may be access controlled by various policies of an access control system that determine whether access is allowed for a user. Access control policies can include requiring login credentials as well as various fraud prevention or other safety systems that control or restrict user access for various reasons indicating suspected fraud or other unauthorized or malicious activity.

Traditional fraud prevention systems may use complicated policies for which it may be difficult or time-consuming to identify potential vulnerabilities. In another context, complex decision-making systems can be difficult for a user to understand, and may pose challenges for users who wish to increase chances of a desired result.

In practice, access control policies are frequently changing to address an ever-evolving threat landscape of malicious behavior and other attempts to breach such policies to access the underlying systems. Accordingly, the cost and complexity of implementing and maintaining robust access control policies that prevent undesired use and allowed desired use is high.

Accordingly, techniques are needed for efficiently testing and modifying access control policies and other complex decision systems to mitigate attacks and improve robustness.

BRIEF SUMMARY

Certain embodiments provide a computer-implemented method of testing complex decision systems using outcome learning-based models, comprising: selecting a subset of parameter types from a universe of test script generator parameter types; assigning one or more assigned values to the subset of parameter types; executing a test script, using the subset of parameter types and the one or more assigned values, against a target system to obtain a first result; generating, using a machine learning model trained based on the subset of parameter types, the one or more assigned values, and the first result, one or more recommended parameter types and one or more recommended values; executing the test script using the one or more recommended parameter types and one or more recommended values to obtain a second result; and executing, based on the second result, one or more actions related to at least one of a recommended parameter type of the one or more recommended parameter types and a recommended value of the one or more recommended values.

Certain embodiments also provide a computer-implemented method for training a machine learning model to generate recommended parameter types and values for achieving a result in an access control system, comprising: receiving a first training data set including one or more parameter types, one or more values assigned to the one or more parameter types, and one or more first results of executing a test script using the one or more parameter types and the one or more values; training a machine learning model to generate one or more recommended parameter types and one or more recommended values for achieving a selected result based on the first training data set; receiving a second result, the second result resulting from the test script being executed using the one or more recommended parameter types and the one or more recommended values; in response to the second result not meeting a success threshold: receiving a second training data set including an additional one or more parameter types and one or more additional values assigned to the additional one or more parameter types; and training the machine learning model to generate one or more additional recommended parameter types and one or more additional recommended values for achieving the selected result based on the second training data set; and in response to the second result meeting the success threshold, deploying the machine learning model.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

In various applications, a complex decision system can include an access control policy of an associated access control system that limits user access to various features of the system based on parameters and values associated with the request. For example, a user login to a web-based product may require a valid login, and additionally can trigger a fraud prevention system associated with the product based on various parameters and values associated with a user action. Fraud detection techniques associated with detecting unauthorized use of the product could be based on various conditions, such as being based on a number of logins or failed logins, a number of user action attempts, a number of failed action attempts, an IP address, a domain name associated with a user email, a geographical origin of the request, cookie data associated with the request, and/or other metadata associated with the request, etc. In some cases, a particular condition may cause access to be allowed or prevented, such as users from a certain IP address or geographical location being "allowlisted" or "blocklisted". In other cases, a condition is probative of potentially malicious activity and increases the likelihood of a restriction for a user but does not automatically trigger a restriction. In other words, various conditions can be used on a deterministic or heuristic basis to trigger (or eliminate), or increase (or decrease) the likelihood of, a restriction.

Such conditions can be determinable by a product or service including a complex decision system which uses the conditions as a basis for decision-making. Such a product or service can also include a network resource or network data for which access is controlled on the basis of such conditions. In another context, a financial instrument or loan service can include complex decision systems deciding whether to deny or grant access to an applicant who may have been denied access or given a negative decision based on such conditions, or for context-specific reasons such as user history, user score, user reputation, etc.

Generally, complex decision systems include access control systems to control access to various resources or other features of the system. In addition to invalid login credentials causing denied access, a login request can also be denied or restricted due to suspected fraud. Certain values for parameters associated with the login request, such as an IP address, can trigger an access control or fraud prevention policy despite valid login credentials. Also, various user actions, either while logged in or without an associated login, can trigger access control policies based on conditions associated with the user action, including both parameters and values related to the user and to metadata associated with the user action.

In some cases, a login request to an accessed controlled system, or any other web-based action, may have data included with an HTTP request and/or metadata associated with the action. An action can include parameters and/or values associated with the avatar performing the action, and can also include parameters obtained from data contained in a cookie associated with the user action. The request metadata can include a request number, timestamp, or other parameters associated with the request. In this context, an "avatar" having a set of parameters and values can be generated and used to perform various actions having the parameters and values as conditions associated with the action. Avatars may be used to represent users of an access control system, such as by mimicking parameter types and/or values for actual users or possible users.

By accurately identifying sets of avatar attributes, parameter types, and/or values resulting in a particular outcome, access control policies can be improved not only to be less vulnerable to fraudulent use, by preventing unauthorized users, but also to less frequently deny access to authentic or authorized users. In the case of access controlled systems being accessed via a web browser, various avatar attributes, parameter types, and/or values included among information and/or metadata associated with a web-based login request or other web-based user action may be used to determine or influence whether access is granted.

Aspects of the present disclosure provide techniques for testing complex decision systems using outcome-based machine learning models. By generating and selecting avatars, and/or otherwise choosing parameters and/or values for executing a test script, and providing the results as training data to a machine learning model training system, recommendations for avatars, or for parameters or values can be determined that have an increased likelihood of achieving a target result.

The parameter types and values can be randomly generated iteratively, until recommendations are optimized for achieving a target result. In some cases, recommended parameters and values relate to features of an avatar representing a user requesting some test feature. However, recommended parameters and values can also relate to metadata associated with execution of a test script. The success rate of the test script execution can be used as a basis for determining whether to iterate execution of the test script one or more additional times until a particular success or failure rate is achieved, until a selected number of iterations is performed, until a limit of the success rate is determined based on the universe of available parameters, or based on some other threshold.

In various embodiments, the test script may execute login requests, but it is not limited to login requests. Rather, the test script can attempt to execute all kinds of functions, operations, features, or other resources controlled by the access control system policy. Recommendations having a high likelihood of a successful login can be generated by a machine learning model as well as or in addition to recommendations for accessing a particular test feature.

Thus, aspects of the present disclosure improve access control systems by determining factors resulting in an optimized success rate. In some cases, a success rate at or near 100% reveals an exploitable vulnerability of the access control system and enables an update to the access control policy of the system. By identifying such vulnerabilities, fraud prevention systems and other access control policies can be improved. Additionally, in some cases, a failure rate at or near 100% reveals a cause for failure, such as a user being denied access because of a user score, user reputation, length of user history, etc. By identifying parameters and values with a high chance of success, users can better focus efforts on adjusting parameters resulting in the restriction of access, resulting in less repeated failure attempts. Similarly, false positives of fraud detection systems can be identified and addressed where the failure rate is at or near 100% for a legitimate user. Thus, various access control systems and associated policies can be improved in multiple ways by embodiments of the present disclosure.

Figure 1:
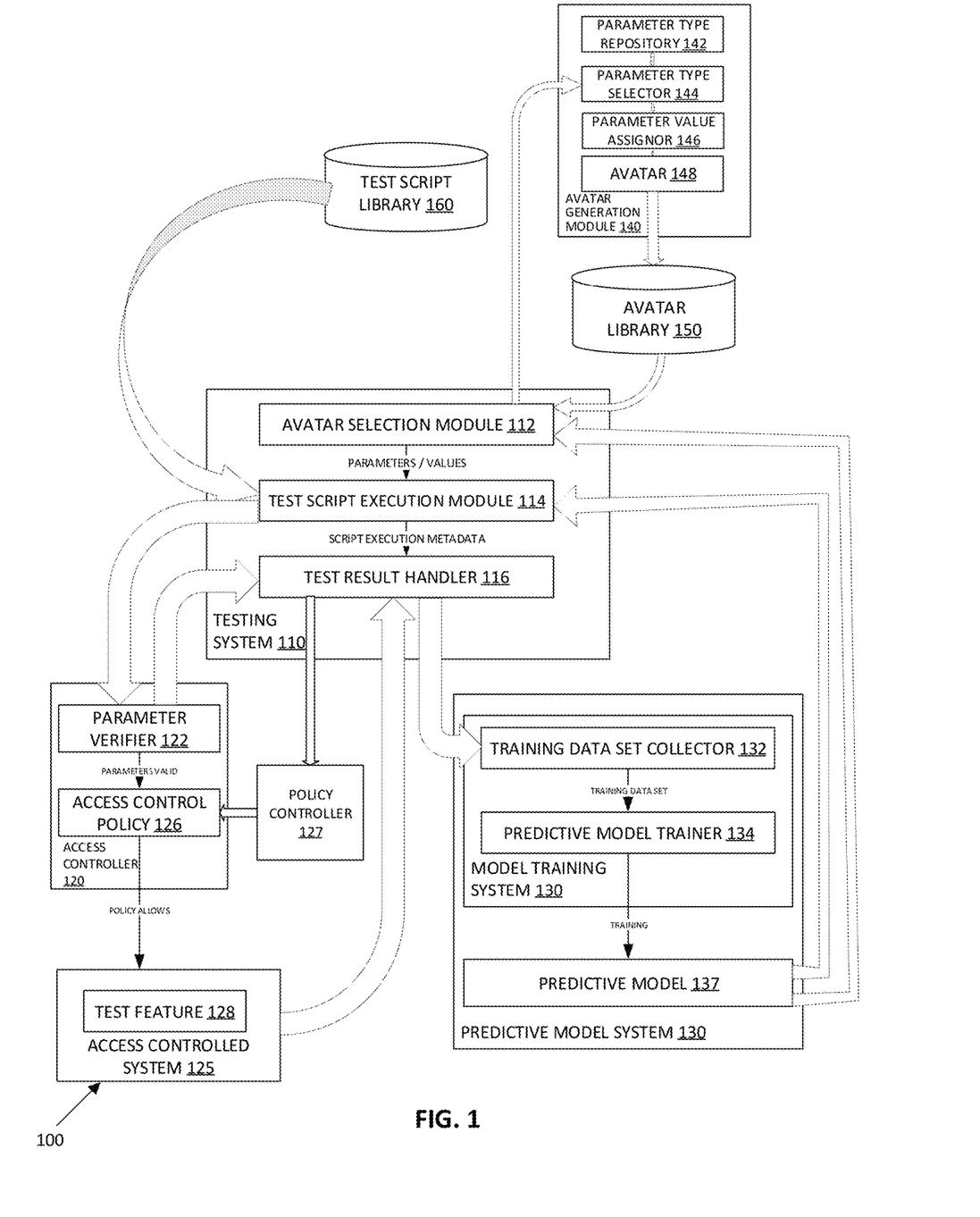
FIG. 1 depicts an example computing environment in which parameters and/or values for achieving a result of an access control system are optimized using a trained machine learning model, according to embodiments.

Example Computing Environment Including an
Access Control System and Outcome Learning
Testing System FIG. 1 depicts an example computing environment 100 in which parameters and/or values used for testing an access control system are optimized using a trained machine learning model, according to embodiments.

As illustrated, computing environment 100 includes a testing system 110, an access controller 120 and a model training system 130. In general, the testing system 110 executes tests against an access controlled system 125 for which access is controlled by the access controller 120, and the testing system 110 receives and records results of the tests. The results, along with related parameters, values, and/or metadata are provided to the predictive model system 130. The predictive model system 130 is trained to predict likelihoods of success and is used to find recommend parameters and/or values determined to have a likelihood of a successful test result. In FIG. 1, the computing environment 100 also includes an avatar generation module 140, an avatar library 150, and a test script library 160.

The example testing system 110 includes an avatar selection module 112, a test script execution module 114, and a test result handler 116. The avatar selection module 112 selects one or more avatars from the avatar library 150 and provides the avatar(s) to the test script execution module 114. In general, an avatar can comprise a plurality of parameter types and respective values for the parameter types which represent the avatar. For example, name, age, geographic location, IP address, or parameters associated with a login or web-based requests (i.e. parameters and values contained in cookies associated with an HTTP request) etc., can all be features of an avatar. In various applications, parameters can include parameters determined from cookie data associated with login requests or attempts to access resources or data. However, requests in certain embodiments may also be not web-based, such as a local user requesting access to a local access controlled system.

The avatar generation module 140 includes a parameter type repository 142, a parameter type selector 144, and a parameter value assignor 146. The parameter type repository 142 stores a list of parameter types corresponding to a universe of parameter types associated with generating an avatar for executing a test script. The parameter types and values can include any information associated with one or more packets of information sent by the testing system when executing a test script against the access control system, including a request line, header or body of the packet. The parameter type selector 144 of the avatar generation module 140 selects one or more parameters from the universe of available parameter types from the parameter type repository 142. A selection of parameter types can be random, predetermined, or algorithmically determined. For example, the parameter type selector 144 can send a request for specified parameters to the parameter type repository 142 and receive, in response, parameters from the parameter type repository 142 consistent with the request. In various cases, new parameter types can be added to the repository, either manually or automatically, such as by being identified in a recommendation of a machine learning model and automatically added to the repository.

The parameter value assignor 146 assigns values to the parameter types selected by the parameter type selector 144. The assigned values can be random, predetermined, or algorithmically determined values. Multiple sets of selected parameter types and values can be generated in this way by the avatar generation module 140 to create a plurality of avatars, such as avatar 148, which may then be stored in the avatar library 150.

When the testing system 110 of some embodiments operates to test an access control system or other complex decision system, the avatar selection module 112 selects an avatar from the avatar library 150. The selection may be random, such as by randomly selecting avatars from the library 150, deterministic, such as by being made by choosing avatars having specified parameters and/or specified values from the avatar library, or performed using "fuzzy" matching, such as by selecting avatars having parameter types and values with a degree of similarity without requiring an exact match. In certain embodiments, the avatar selection module can send a request or otherwise cause the avatar generation module to generate additional avatars having a selection of parameters and/or values specified by the avatar selection module. For example, the avatar selection module may request a number of avatars to be generated by the avatar generation module having a specified geographic location value for a geographic location parameter type and random values for a random selection of other parameter types for testing results for the specified parameter types, such as by determining whether results having a specified value for one or more parameter types are affected by changing other parameter types or values. In other embodiments, the parameter types and values are all chosen at random or semi-randomly (i.e., random selection with some constraints).

In various embodiments, the test script execution module 114 executes one or more test scripts selected from the test script library 160 using a plurality of avatars selected by the avatar selection module 112. In some cases, the test script execution module 114 may execute a test script using a particular avatar more than once. For example, a test script can be executed more than once by an avatar by executing multiple login requests using the avatar. Metadata such as a request number or timestamp for the login can be included with the results of executing the test script. A high number of requests within a particular time period can be an indication of malicious activity or fraud. Certain fraud prevention techniques based on a number of requests exceeding a threshold for a particular time period may trigger or cause in increase in a likelihood of access control. Thus, request number and timestamp, for example, can be testable parameters for the access control system.

Various metadata associated with executing a test script can include, without limitation, a request time, a request number, a request origin, calendar information, requesting device information, requesting device connection type, browser information, velocity parameters, reputation parameters, a number of recent requests, a number of requests in a particular time period, a density of requests at a time of day, an number of requests associated with an IP address within a certain period of time, a number of failure for an IP address, a failure ratio of failures to successes for an IP address, a failure ratio trajectory, and/or various parameters associated with contents of one or more cookies associated with the request and related to one or more of management of a session associated with the request, personalization of the session associated with the request, or tracking and/or analytics of the session associated with the request, and/or other metadata.

It is noted that the computing environment of FIG. 1 is exemplary in nature, and therefore it is anticipated that the avatar generation module 140, avatar library, 150, and/or test script library 160 might be incorporated into testing system 110, or be otherwise configured in the computing environment 100.

In response to executing a test script against the access controlled system 125 via the access controller 120, results can be received from the access controller 120 or the access controlled system 125. For example, a result can include whether a log in attempt was successful or unsuccessful, whether an application was accepted or denied, or whether a particular action was allowed or restricted. In some cases, a test may succeed for one unit of the test (i.e., a login) and not succeed for another unit of the test (i.e. a request to alter account details or a request to transfer funds failing after a successful login). A test script can comprise any number of test script units. The results received from the access controller 120 or access controlled system 125 can include a particular result for each test script unit. A machine learning model may be trained using outcome learning techniques to learn outcomes by using the results of the test script units of the test script as labels or target features.

In the example of FIG. 1, the access controller 120 comprises a parameter verifier 122, and an access control policy 126. When the test script execution module 112 performs a login request or other action, the parameters and values associated with that request are checked or verified by the parameter verifier module 122. If the parameters and/or associated values are not valid, a failed result is returned from the parameter verifier 122 to the test result handler 116.

When the test script execution module 114 performs a login request or other action, whether access is permitted is determined by the access control policy 126 according to the parameters, values, and metadata associated with the request or other action. One or more test features, such as a test feature 128 can be included in the access controlled system 125. In some cases, the parameter verifier 122 may verify parameters associated with a login request, but the access control policy 126 does not allow access to the access controlled system 125. In some cases, the access control policy 126 allows access to the access controlled system 125 but does not allow use of the test feature 128.

In general, an avatar having verified parameters may still be subject to an access control policy of the access control system. In various cases, parameters may be verified for some actions but not others. For example, various degrees of privileges (i.e. user, host, admin/superuser), can be granted based on parameters. Also for example, in some cases a log in is allowed based on a set of parameters, while other actions require additional authentication, such as a login to a bank account being allowed, but a transfer of funds out of the account requiring additional authentication. Additionally, suspicious activity such as a high volume of requests, an unusual geographic origin, an unusual IP address, or other activity indicating malicious or automated behavior, can trigger fraud prevention incorporated into the access control policy 126 of the access controller 120.

In various embodiments, the test result handler 116 can receive and/or record results of the test script. The results received by the test result handler can include results from the parameter verifier 122, including the parameters and values used, whether the result was successful, and metadata about the test script execution. The results received by the test result handler can also include results from a test script which operates one or more test features of an access controlled system 125, such as test feature 128. In general, one or more access controlled systems 125 can include a plurality of test features for which access is controlled by the access controller 120.

Example results which may be received by the test result handler include whether a request to access the access controlled system 125 and/or whether a request for a resource or a test feature 128 was denied by the access control policy 126 of the access controller 120. In cases, parameters and values will have first been verified by the parameter verifier 122. In such cases, the parameters and values may be used to operate the test feature 128 as part of executing the test script. Data related to whether the execution is successful, resulting data from operating the test feature, and/or any metadata associated with executing the test script to attempt to use the test feature (and/or login) may be included in the results received by the test result handler 116.

In response to receiving the results, the test result handler 116 may perform various actions based on information included in the results received from access controller 120 or access controlled system 125, For example, the handler 116 can send results to the model training system 130 including one or more of whether a set of parameters and values for an avatar was verified, whether a policy controller allowed a test feature to be operated by the avatar, and/or results of executing the test feature using for the avatar, along with result metadata such as test number, timestamp, place of origin, or other metadata associated with the test script (or units of the test script) being executed. In embodiments, the test result handler 116 may cause a change to the access control policy 126 of the access control system by sending a command or request to a policy controller 127. In response to the command or request, the policy controller 127 may cause a change in the access control policy 126. In embodiments, detecting a vulnerability may result in an automatic change to the policy to eliminate the vulnerability.

In some embodiments, the test result handler is in communication with or includes an instruction generation engine. The instruction generation engine of embodiments classifies results received from the result handler 116 and, based on the classification of the results, performs one or more actions within a system. In various cases, the instructions generation engine can cause instructions to be executed to adjust an access control policy 126 and/or to be sent to the test result handler 116 for further processing or handling.

In FIG. 1, the predictive model training system 130 includes a training data set collector 132 and a predictive model trainer 134. In the example, the training data set collector 132 receives test script results as training data from the test result handler 116. The test script results are included as training data for use by a machine learning trainer which trains or fine-tunes predictive models, such as predictive model 137. Models such as model 137 can be trained or fine-tuned using training data sets which include avatar parameter types and values, test script execution results, and metadata associated with, for example, login requests or other attempts to access a resource or data of an access controlled system. Further detail of how the model training system 130 trains a model such as model 137 is discussed further with respect to FIG. 2.

Figure 2:
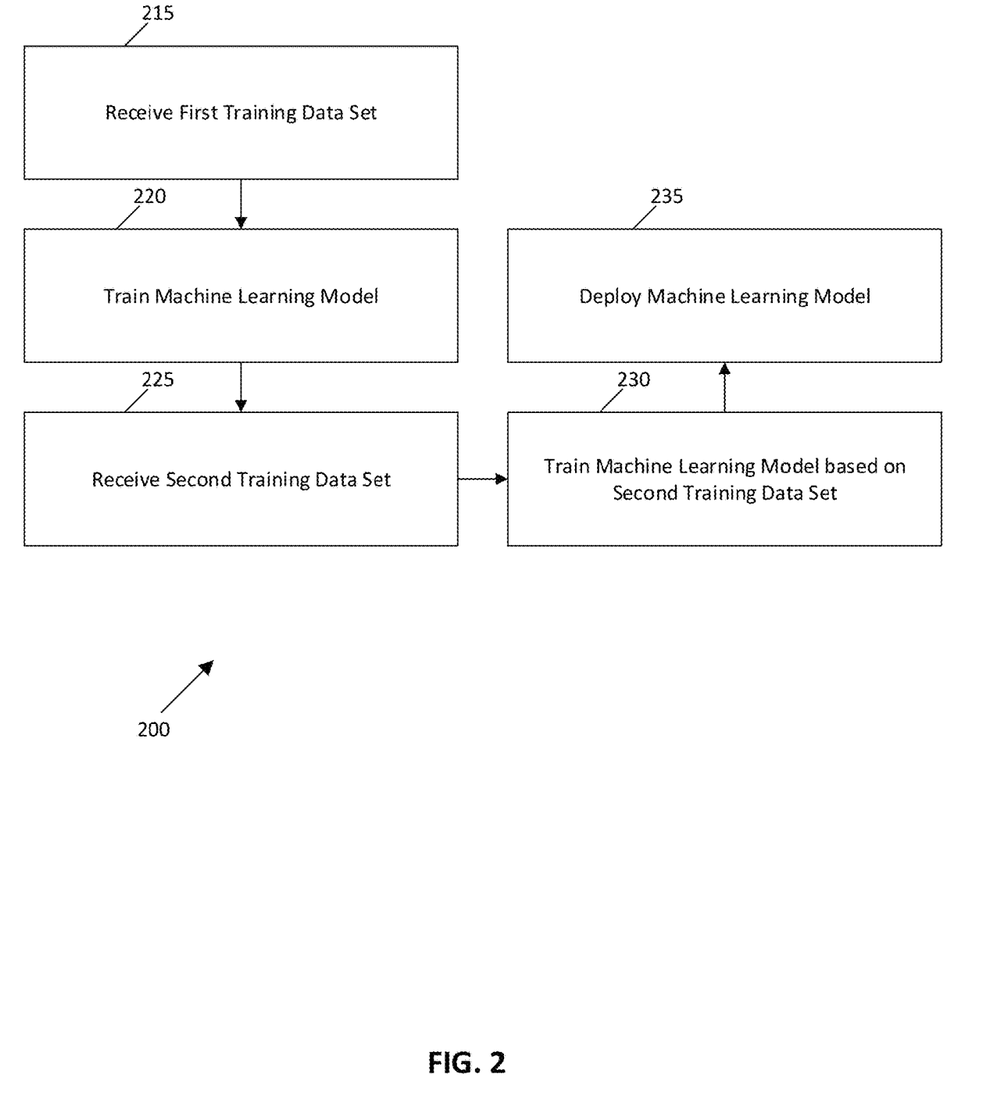
FIG. 2 is a flow chart illustrating example operations for performing one or more actions based on the results of a test script executed using one or more selected avatars, parameters, and/or values, according to embodiments.

Example Method of Machine Learning Model Training for Providing Recommendations for Achieving an Outcome in an Access Control System FIG. 2 is a flow chart illustrating example operations 200 for using test script results to train machine learning models to generate recommendations for avatars, parameters, or values achieving a result in an access control system. The operations described herein may be performed by a model training system, such as model training system 130 of FIG. 1.

In FIG. 2, the operations 200 begin and may proceed to stage 215 where a first training data set is received. For example, a training data set collector can receive, from a test result handler, results, such as results of executing a test script against a test feature of an access controlled system and/or metadata associated with executing the test script. In various embodiments, results of executing the test script are included in the training data along with any associated parameters and values used to execute the test script. However, training data is not limited to results or test script execution metadata, and may include other data in cases.

The operations 200 may proceed to stage 220 where a machine learning model is trained. For example, a predictive machine learning model can be trained or fine-tuned to generate one or more recommended parameter types and/or one or more recommended values for achieving a selected result based on training data received from a testing system such as testing system 110.

For instance, training data including avatar parameter types, parameter values and results of executing one or more test scripts using the avatar parameter types and values can be input to the model and included as variables to be modelled by the trained model. The results can include, for any number of test script units of the test script, an indication of whether the test script unit was successful, which may be used as a label or target value for supervised machine learning model training. The avatar parameter types, parameter values, and metadata values associated the test script are used as input examples or features for supervised machine learning model training.

The adjusting of model parameters associated with the modeling of the training data may be based on evaluating an objective function (e.g., a cost function or loss function) for optimizing one or more such variables (e.g., for model accuracy). One or more variables of such an objective function may relate to whether the predictions produced by the machine learning model based on the training data features matches the labels or target values associated with successful test script results, or, alternatively, whether a measure of error, or "loss," between training iterations is not decreasing, or not decreasing more than a threshold amount. The conditions may also include whether a training iteration limit has been reached. Parameters adjusted during training may include, for example, hyperparameters, values related to numbers of iterations, weights, functions used by nodes in a neural network to calculate scores, and the like.

The operations 200 may proceed to stage 225 where a second training data set is received. Results generated from testing the access control system by a testing system can be aggregated by a model training data collector. The second training data set may include one or more additional parameter types and/or one or more additional parameter values for the one or more additional parameter types, results of executing the test script using the additional parameter types and the additional parameter values, and metadata associated with executing the test script.

The operations 200 may proceed to stage 230 where a machine learning model is trained or retrained based on the second training data set. In various embodiments, the machine learning model may be newly trained, or may be fine-tuned from a pre-existing model. Previous training data can be optionally included in subsequent retrainings or fine-tunings of the model. In general, predictions from the model can be used to execute a test script to receive results used to determine whether to perform some action, such as receiving more training data and retraining the model iteratively until a threshold is met.

The operations 200 may proceed to stage 235 where machine learning model can be deployed. In various embodiments, the model can be deployed after the machine learning model is trained based on the second training data set, or alternatively after a selected number of iterations, or until a threshold success rate is reached. From stage 235 where the machine learning model is deployed, the operations 200 proceed to conclude.

Example Method of Outcome Learning for Access Control Systems

Figure 3:
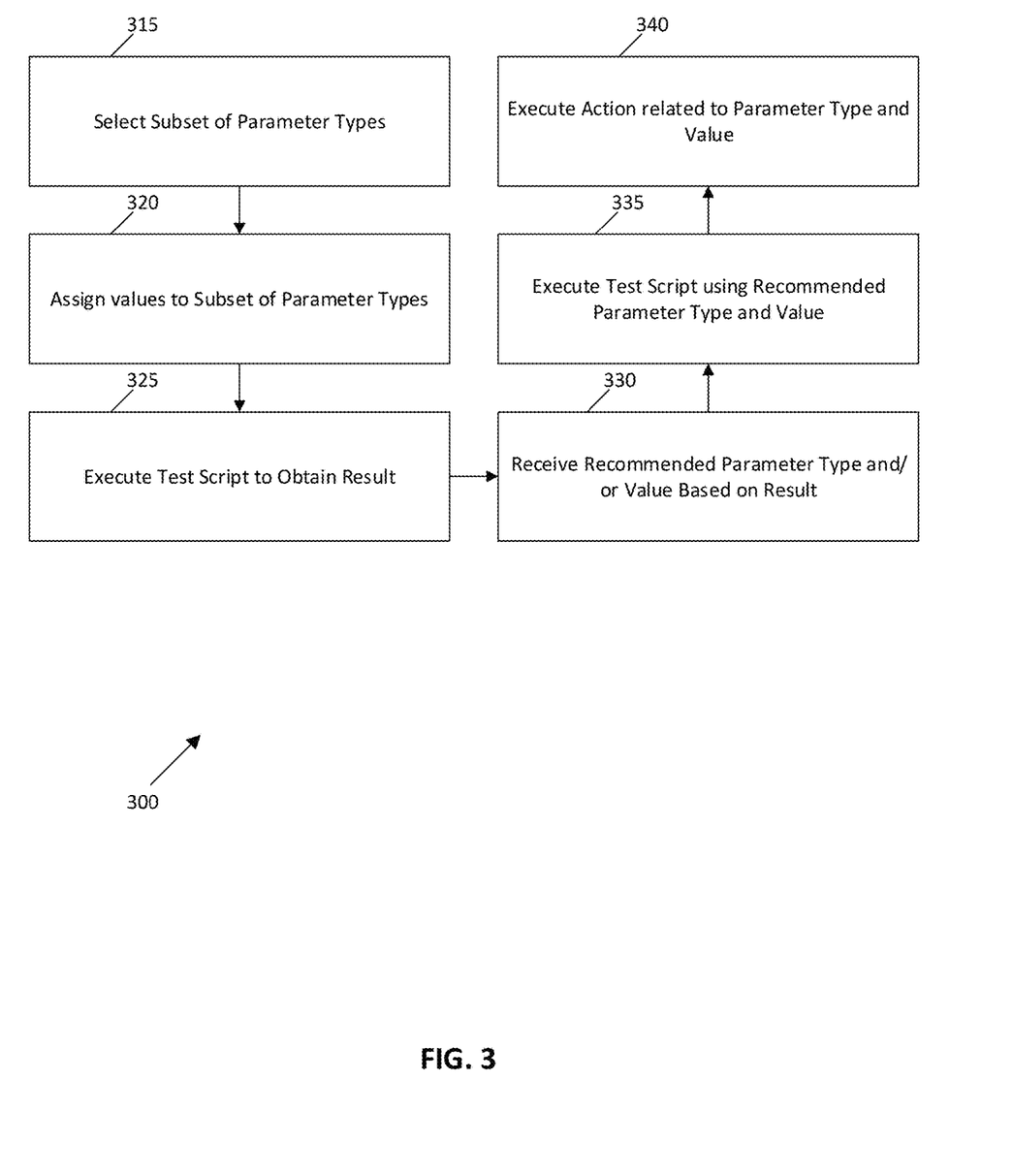
FIG. 3 is a flow chart illustrating example operations for providing recommended avatars, parameters, or values to a testing system based on machine learning models trained to identify avatars, parameters, or values achieving a result in the system, according to embodiments.

FIG. 3 is a flow chart illustrating example operations 300 for performing one or more actions based on the results of a test script executed using one or more selected avatars, parameters, and/or values. The operations described herein may be performed by the testing system 110 of the computing environment 100.

As illustrated, operations 300 may begin and proceed to stage 315 where a subset of parameters types is selected. For example, a testing system may include an avatar selection module, which may access an avatar library from which avatars having the subset of parameter types can be selected either at random. Alternatively, the avatar selection module can request avatars to be randomly generated by an avatar generation module according to some constraints and/or can receive the randomly generated avatars, or can otherwise select a subset of parameter types some other way. In cases some or all avatars may include all parameter types and have a value assigned for each type.

The operations 300 may proceed to stage 320 where values are assigned to the subset of parameter types. In some embodiments, an avatar selection module may select one or more avatars having randomly assigned values for the avatar's parameter types, which may be also randomly selected. In other embodiments, avatars may be randomly generated by an avatar generation module in response to a request from an avatar selection module, and the randomly generated avatars may be optionally stored in an avatar library.

The operations 300 may proceed to stage 325 where a test script is executed. For example, one or more test scripts, or a test script with multiple test script units, can be executed. Test scripts can include operations and/or functions for performing logins or for otherwise interacting with an application or website. Upon execution, a result of the test script can be generated, obtained, and/or recorded, such as by a test result handler of a testing system.

The operations 300 may proceed to stage 330 where a recommendation for a parameter type and/or value is generated based on the result. For example, results can include one or more of whether a login attempt was successful, whether a request for a resource was successful, parameters and values associated with an avatar used for the request, as well as metadata associated with the request. Recommended parameter types and/or values having the highest (or lowest) likelihood of achieving a selected result of the access control system, such as a successful login or use of a test feature, can be received from a model previously trained using test script results as test feature labels.

The operations 300 may proceed to stage 335 where a test script is executed using a recommended parameter type and value. For example, the predictive model can provide one or more parameters and/or values. These parameters types and/or values can be used to execute the test script to determine a second set of results.

The operations 300 may proceed to stage 340 where an action is executed related to a parameter type and/or value. For example, the second set of results of the test script being executing using parameters recommended by the predictive model may be received by the result handler of the testing system. In response, the test handler can perform one or more actions such as adding a rule to an access control policy in response to a high or low success rate, or such as generating additional training data to send to a model training system for retraining the machine learning model. As an example, in response to a high success rate using a particular set of parameter types and parameter values, a policy may be adjusted to only allow a narrower range of values for that parameter type or to add a rule, such as preventing access or allowing less logins per day from a physical or network location under certain conditions or requiring additional verification for certain types of requests.

In response to a low success rate, new training data may be generated by using random parameter types and random values to execute a test script and generate additional test script results. The new training data may be used to retain the model. From stage 340 where the one or more actions is executed, such as by a test result handler 116, the operations 300 may conclude.

In certain embodiments, the test script may be executed iteratively using subsequent parameter types and subsequent values to generate subsequent test script results. The subsequent test script results for each iteration may be provided the model training system. During each iteration, the predictive model is trained using the subsequent parameters and values as features, and using the subsequent results as labels or target features. The iterative process can be continued until a success threshold is reached or some other stop condition is reached.

Figure 4:
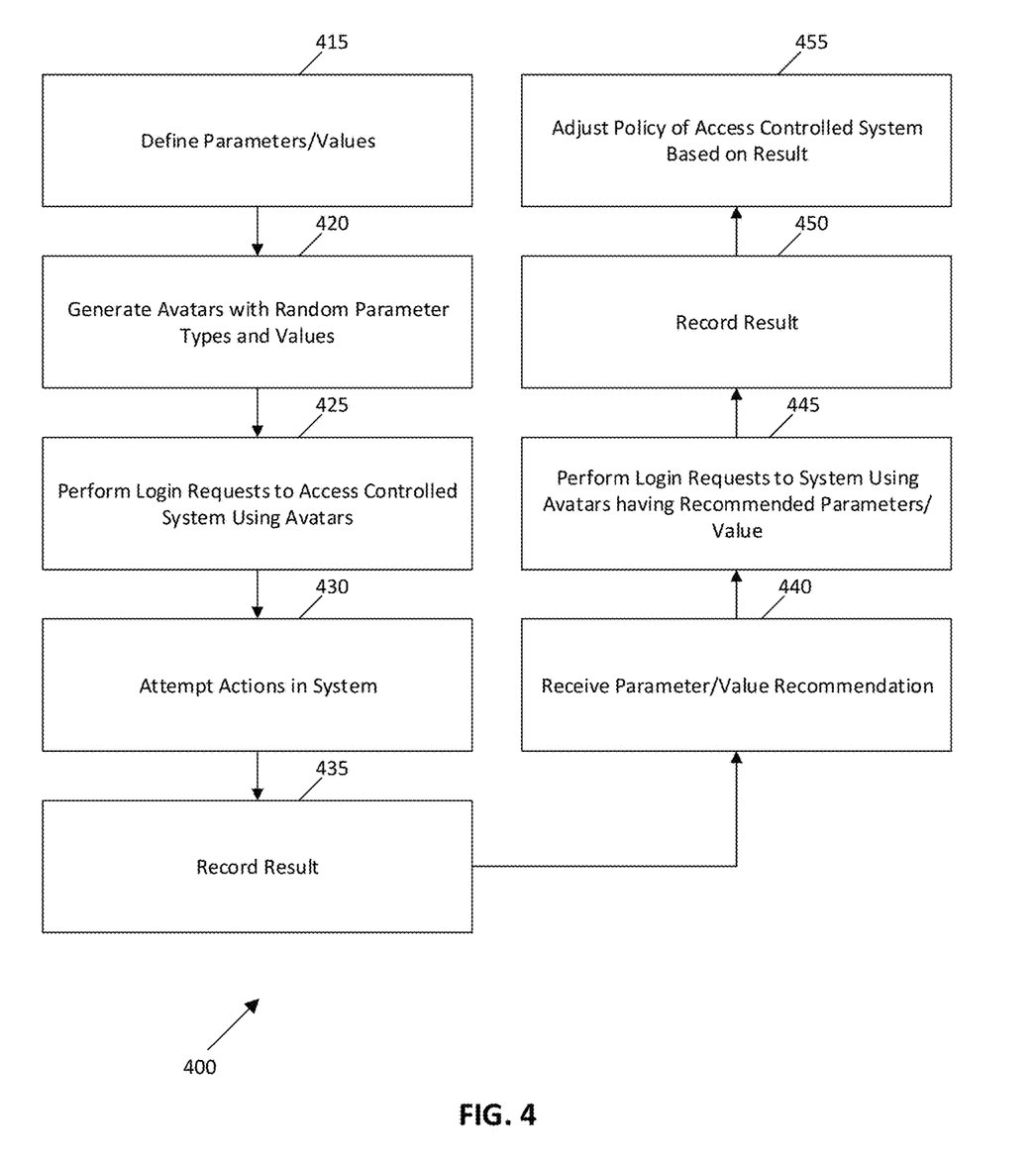
FIG. 4 is a flow chart illustrating example operations for adjusting an access control policy of an access control system based on results of outcome learning for the access control system, according to embodiments.

Example Method of Adjusting an Access Control Policy Based on Outcome Learning for an Access Control System FIG. 4 is a flow chart illustrating example operations 400 for adjusting an access control policy of an access control system based on results of outcome learning for the access control system, according to embodiments. In the example of FIG. 4, operations 400 begin and proceed to block 415 where a set of parameters and values is defined. For example, a subset of a universe of possible parameter types can be selected. For each parameter type of the subset, a range or set of allowable values can be defined from which assigned values may be selected at random and assigned to parameter types for an avatar.

The operations 400 may proceed to stage 420 where avatars with random parameter types and values are generated. For example a plurality of avatars can be generated having random parameter types randomly selected from the subset of parameter types and random values selected within the allowable ranges defined for the parameter types.

The operations 400 may proceed to stage 425 where login requests to an access controlled system are performed using the avatars. For example, a specified number of login requests over a period of time can be executed by executing one or more test scripts using the avatars. In such examples, each login request may have a request number and timestamp associated therewith. The request number may be an avatar-specific request number related to the number of times a request has been performed by a specific avatar, or the request number may be related to the number of times a request has been performed in total for any avatar.

The operations may proceed to stage 430 where actions within the system are attempted. For example, an attempt to use a test feature, such as performing a function, accessing a resource, or accessing data of an access controlled system can be performed using the avatars. Data generated in response to using the test feature may be included in results of performing associated test scripts.

The operations 400 may then proceed to stage 435 where results are recorded. Results of whether the login request at stage 425 and/or the attempt to perform the action in the system at stage 430 are successful, along with any associated metadata, can be recorded. In various embodiments, the login request and attempt to perform an action may be the result of executing a test script.

The operations 400 may continue at stage 440 where a parameter and/or value recommendation is received. For example, a set of parameter types and respectively assigned parameter values can be received from a trained machine learning model trained using avatar information, test script results, and associated metadata. In various embodiments, the model is a predictive model such as a machine learning model (e.g., a neural network or other type of machine learning model) that is trained through a supervised learning process based on labeled training data, such as described herein with respect to FIGS. 1 & 2.

Operations 400 may proceed to stage 445 where login requests to the access controlled system are performed using a plurality of avatars having a recommended parameter and/or value. One or more test scripts may be executed using an avatar matching the recommendation. The avatars may be selected from an avatar library or generated according to the recommended parameter types and/or values. However, it is noted a test script may also perform login requests or requests for other test features without requiring an associated avatar. In a particular embodiment, avatars are generated using random parameters and random values, and a set of avatars having a subset of parameters that match the recommendation are selected to perform the requests.

Operations 400 may continue at stage 450 where a result is recorded. Information such as whether the login request of stage 445 is successful may be recorded, along with avatar parameter types, values, and metadata associated with executing the test script to get the results. In various embodiments, actions other than a login request, such as use of a test feature, can be performed and results of the actions can be recorded. The results can include whether the test feature was successfully performed, and any associated data or metadata, with each of a plurality of avatars.

The operations 400 may proceed to stage 455 where a policy of the access controlled system is adjusted based on the result. For example, one or more combinations of parameter types and/or values may have a success rate or a failure rate at or near 100%. In the example, an access control policy of the access controlled system can be adjusted so that the determination of whether access is allowed is based on a different set of parameter types or a different range of values associated with a login request or an attempt to perform a test feature.

From stage 455 where the access control policy of the access controlled system is adjusted, the operations 400 may conclude. Alternatively, the adjusted policy resulting from the adjustment of stage 455 can be tested iteratively until some condition, such as a success rate threshold, is reached. The original or newly adjusted policy can be iteratively tested and adjusted such as by retraining a machine learning model using iterative results, receiving recommendations from the model, executing one or more test scripts against the test feature of the access controlled system whose access controlled by the policy using the recommendations, and adjusting the policy based on the results of the test script. After one or more iterations of executing a test script against the access controlled system using recommended parameter types and values, recording the results, and adjusting the policy based on the results, the operations 400 can conclude.

A success rate for an initial set of random parameters and random values is improved by using parameters and/or values recommended by the machine learning model after being trained using one or more results of a testing system executing a test script using one or more sets of random parameter types and random values. In a particular example, the initial success rate of an action executed against an access control system using a first set of random parameters and random values is 10%. Continuing the example, the success rate of a second result using a first set of recommended parameters and recommended values recommended by a machine learning model trained using the initial set of random parameters and random values, the first result, and metadata associated with the first result, can be higher than 10%, and possibly 100%. A success rate of a third set of results of executing the test script using a second set of random parameters and random values in an example is 10%. A success rate of a fourth result using a second set of recommended parameters and recommended values recommended by a machine learning model trained using the initial set of random parameters and values, the first result, and metadata associated with the first result, the second set of random parameters and values, the third result, and metadata associated with the third result is approximately 99%-100%.

It is possible that a success rate near 100% can be achieved in more or less iterations, such as being achieved after one, two, or more iterations. In some cases, a success rate near 100% can be achieved by replacing an unknown, random, or null value for a parameter type of a cookie associated with an action or request with a value for that cookie parameter type that is recommended by the predictive model. For example, the model may determine a cookie parameter type from results of executing one or more test scripts. The cookie parameter type may be initially unknown or have an unknown value. The model may determine from results of executing the test script that executing the test script with a cookie parameter type having a particular value improves a likelihood of success as opposed to executing the test script without the cookie parameter type, or with a null, unknown, or random value for the cookie parameter type. In embodiments, a value for unknown cookie parameter type for an avatar is replaced with a cookie parameter type having determined by a machine learning model recommendation.

In general, cookie data can refer to data stored on a user device which may be included in the data sent with various login requests to an access control system or with other web actions. By replacing cookie data in memory, or by adding cookie data to a request, such as by including a value for a data type in cookie data not previously included in the cookie data using a recommended cookie data value from a recommendation received from a machine learning model, a high rate of success can be achieved in few iterations.

Based on the success rate of the results, an access control policy of the access control system can be adjusted. For example, a rule related to values for parameter types related to the action can be adjusted, such as by changing or adding a rule for a cookie parameter type for which access is automatically allowed (i.e. revoking automatic access for a cookie parameter type and value, such by additional access control rules being implemented for a login or other web request using the cookie parameter type and/or value).

Example System Performing Outcome Learning of Access Control Systems

Figure 5:
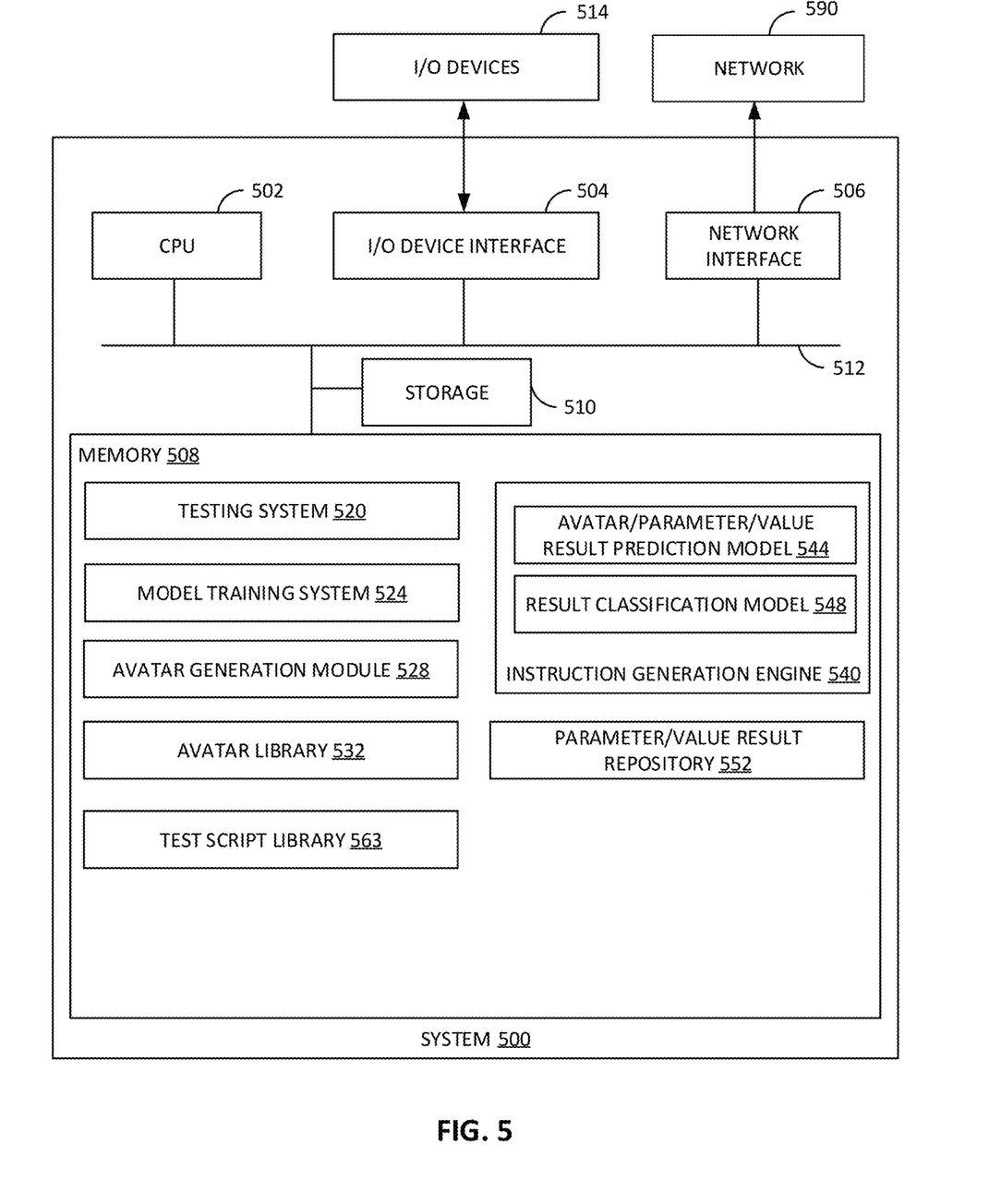
FIG. 5 illustrates an example system on which various embodiments of the present disclosure can be performed.

FIG. 5 illustrates an example system 500 on which various embodiments of the present disclosure can be performed. In FIG. 5, the system 500 is configured to perform the methods described herein, including, for example, operations 300 of FIG. 3. In some embodiments, system 500 may act as a testing system, such as a system executing a test script against an access control system, for example by using an avatar and/or parameters recommended by a machine learning model.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506 through which system 500 is connected to network 590 (which may be a local network, an intranet, the internet, or any other group of computing devices communicatively connected to each other), a memory 508, storage 510, and an interconnect 512. In general, data may be loaded to and from memory 508 and storage 510 as needed during operation of the system. CPU 502 may retrieve and execute programming instructions stored in the storage 510. Similarly, the CPU 502 may retrieve and store application data residing in the memory 508.

The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. The I/O devices 514 and/or network interface 506 may be used to receive a query in a natural language utterance through a chatbot application and output a response to the query generated based on extracting operators and operands from the natural language utterance.

Memory 508 is representative of a volatile memory, such as a random access memory, or a nonvolatile memory, such as nonvolatile random access memory, phase change random access memory, or the like. As shown, memory 508 includes a testing system 520, a model training system 524, an avatar generation module 528, an avatar library 532, a test script library 536, an instruction generation engine 540 having a result prediction module 544 and a result classification module 548, and a parameter/value result repository 552.

The testing system 520 of embodiments performs various functions and has features and modules related to testing and executing test scripts, such as an avatar selection module, a test script execution module, and/or a result handler. In various embodiments, the testing system 520 can optionally include an avatar generator, avatar library or test script library.

The model training system 524, performs various functions and has features and modules related to training a model, such as by performing training on a machine learning model using a training data set including parameters, values, and metadata associated with executing a test script and results of executing the test script against an access control system.

The avatar generation module 528 includes features for generating avatars having specified or random parameter type and values. The generated avatars are stored, along with any other avatars, in the avatar library 532. The test script library 536 includes a library of test scripts which may be executed by the testing system. Test scripts can include multiple test script units.

The shown instruction generation engine 540 may generate a recommendation for one or more parameter types and/or values for achieving a particular result specified by a user. For example, the result prediction module 544 can provide a universe of available parameter types and values to a trained model. The trained model can generate a recommendation including one or more parameters and/or values based on a likelihood of achieving the particular result. The result classification module 548 causes one or more test scripts to be executed using a testing system, such as testing system 520 using the recommendation received from the trained model. In various embodiments, results of executing a test script can be received by the result classification module, which associates the results with a result type of a plurality of result types. According to the result type, instructions are generated which may be provided to the user. Example instructions according to result type can include, by way of non-limiting example: instructions to retrain a model using the results based on a success rate of the results; instructions to update an access control policy of an access controlled system based on a success rate of the results; instructions to issue a notification or warning, such as to an administrator, based on a success rate of the results; instructions to perform one or more test scripts based on whether one or more requests associated with the results was successful; instructions to take no action based on a test number associated with the results, and/or combinations of these or other instructions.

The parameter/value result repository 552 stores sets of parameters and values, such as sets of avatars, and results associated with executing one or more test scripts using those parameters and values (or using particular avatars). For example, the repository 552 can include many avatars each having a plurality of parameter types, each parameter type of each avatar having a respective value. The avatars can each include a set of test script results related to the avatar and include whether one or more login attempts or requests to access a feature or resource of an access controlled system is successful. Metadata associated with executing the test scripts for a particular avatar can also be included in the data associated with the avatar, such as (login or resource) request number, timestamp, number of associated requests per time period, geographic origin, IP address, etc., It is noted that an avatar may have a place of geographic origin different than an origin associated with an execution of the test script. Thus, similar data types can be both associated with and have different values for an avatar and with metadata associated with a test script execution, and each may be recorded.

Example Clauses

Various embodiments disclosed herein include, by way of non-limiting example, the following aspects:

Aspect 1: A method, comprising: selecting a subset of parameter types from a universe of test script generator parameter types; assigning one or more assigned values to the subset of parameter types; executing a test script, using the subset of parameter types and the one or more assigned values, against a target system to obtain a first result; generating, using a machine learning model trained based on the subset of parameter types, the one or more assigned values, and the first result, one or more recommended parameter types and one or more recommended values; executing the test script using the one or more recommended parameter types and one or more recommended values to obtain a second result; and executing, based on the second result, one or more actions related to at least one of a recommended parameter type of the one or more recommended parameter types and a recommended value of the one or more recommended values.

Aspect 2: The method of Aspect 1, wherein executing the one or more actions comprises: determining whether the second result meets a success threshold; and based on the second result meeting the success threshold, performing a selection of one or more of: updating a policy, generating an alert, and executing a second test script.

Aspect 3: The method of any of Aspects 1-2, wherein executing the one or more actions comprises: determining whether the second result meets a success threshold; based on the second result not meeting the success threshold, until a result set meets the success threshold or a stop condition is reached, performing between one and n iterations, each iteration comprising: selecting an additional random subset of parameter types from the universe of parameter types; assigning one or more additional random values to the additional random subset of parameter types; executing the test script against the target system using the additional random subset of parameter types and the one or more additional random values to produce an additional first result set; adding the additional first result set to the first result to produce a first combined result; generating, using a machine learning model trained based on the first combined result, one or more additional recommended parameter types and one or more additional recommended values; executing the test script using the one or more additional recommended parameter types and the one or more additional recommended values to obtain an additional second result; and determining whether the additional second result meets the success threshold.

Aspect 4: The method of any of Aspects 1-3, wherein: executing the test script against the target system comprises executing a login request; and recording the first result of the test script comprises: recording whether the login request was successful; and recording metadata associated with the login request.

Aspect 5: The method of any of Aspects 1-4, wherein the metadata associated with the login request includes a selection at least one of: a request time, a request number, a request origin, calendar information, requesting device information, requesting device connection type, browser information, velocity parameters, reputation parameters, a time period request number, an IP address request number, a failure ratio, and a cookie contents.

Aspect 6: The method of any of Aspects 1-5, wherein the target system is an access controlled system and executing the test script comprises: executing a request for a feature of the access controlled system; detecting a restriction from the feature of the access controlled system; and recording metadata associated with the request for the feature in a result of the test script.

Aspect 7: The method of any of Aspects 1-6, further comprising, based on the second result: triggering an adjustment of an access control policy of the access controlled system, the adjustment comprising a change in access related to the subset of parameter types and the one or more assigned values.

Aspect 8: The method of any of Aspects 1-7, wherein: executing the test script using the subset of parameter types and the one or more assigned values comprises: executing the test script against the target system a number of times over a period of time using a plurality of avatars having randomly selected parameter types and randomly assigned values to generate the first result, the randomly selected parameter types comprising a plurality of attribute types associated with a possible user of the target system.

Aspect 9: A system, comprising: a memory having executable instructions stored thereon; and one or more processors configured to execute the executable instructions to cause the system to: select a subset of parameter types from a universe of test script generator parameter types; assign one or more assigned values to the subset of parameter types; execute a test script, using the subset of parameter types and the one or more assigned values, against a target system to obtain a first result; generate, using a machine learning model trained based on the subset of parameter types, the one or more assigned values, and the first result, one or more recommended parameter types and one or more recommended values; execute the test script using the one or more recommended parameter types and one or more recommended values to obtain a second result; and execute, based on the second result, one or more actions related to at least one of a recommended parameter type of the one or more recommended parameter types and a recommended value of the one or more recommended values.

Aspect 10: The system of Aspect 9, wherein the executable instructions further cause the system to: determine whether to execute one or more actions based on the second result by: determining whether the second result meets a success threshold; and based on the second result meeting the success threshold, performing a selection of one or more of: updating a policy, generating an alert, and executing a second test script.

Aspect 11: The system of any of Aspects 9-10, wherein the executable instructions further cause the system to: determine whether to execute one or more actions based on the second result by: determining whether the second result meets a success threshold; based on the second result not meeting the success threshold, until a result set meets the success threshold or a stop condition is reached, perform between one and n iterations, each iteration comprising: selecting an additional random subset of parameter types from the universe of parameter types; assigning one or more additional random values to the additional random subset of parameter types; executing the test script against the target system using the additional random subset of parameter types and the one or more additional random values to produce an additional first result set; adding the additional first result set to the first result to produce a first combined result; generating, using a machine learning model trained based on the first combined result, one or more additional recommended parameter types and one or more additional recommended values; executing the test script using the one or more additional recommended parameter types and the one or more additional recommended values to obtain an additional second result; and determining whether the additional second result meets the success threshold.

Aspect 12: The system of any of Aspects 9-11, wherein the executable instructions further cause the system to: execute the test script against the target system by executing a login request; and record the first result of the test script by: recording whether the login request was successful; and recording metadata associated with the login request.

Aspect 13: The system of any of Aspects 10-12, wherein the metadata associated with the login request includes a selection at least one of: a request time, a request number, a request origin, calendar information, requesting device information, requesting device connection type, browser information, velocity parameters, reputation parameters, a time period request number, an IP address request number, a failure ratio, and a cookie contents.

Aspect 14: The system of any of Aspects 9-13, wherein the target system is an access controlled system and the executable instructions further cause the system to execute the test script by: executing a request for a feature of the access controlled system; detecting a restriction from the feature of the access controlled system; and recording metadata associated with the request for the feature in a result of the test script.

Aspect 15: The system of any of Aspects 9-14, wherein the executable instructions further cause the system to, based on the second result: trigger an adjustment of an access control policy of an access controlled system, the adjustment comprising a change in access related to the subset of parameter types and the one or more assigned values.

Aspect 16: A method, comprising: receiving a first training data set including one or more parameter types, one or more values assigned to the one or more parameter types, and one or more first results of executing a test script using the one or more parameter types and the one or more values; training a machine learning model to generate one or more recommended parameter types and one or more recommended values for achieving a selected result based on the first training data set; receiving a second result, the second result resulting from the test script being executed using the one or more recommended parameter types and the one or more recommended values; in response to the second result not meeting a success threshold: receiving a second training data set including an additional one or more parameter types and one or more additional values assigned to the additional one or more parameter types; and training the machine learning model to generate one or more additional recommended parameter types and one or more additional recommended values for achieving the selected result based on the second training data set; and in response to the second result meeting the success threshold, deploying the machine learning model.

Aspect 17: The method of Aspect 16, wherein the selected result comprises accessing a resource of an access controlled system; and one or more results of executing the test script includes metadata associated with a request executed by the test script, the request including a request for the resource of the access controlled system, and the metadata associated with executing the test script including a selection of one or more of: a test attempt number, a test time stamp, a geographic place of origin, a web domain, a web browser type, a typing tempo signature, a mouse movement signature, and a cookie contents.

Aspect 18: The method of any of Aspects 16-17, further comprising: until a stop condition is reached, iteratively: receiving a subsequent training data set including one or more subsequent parameter types and one or more subsequent values; training the machine learning model to generate one or more subsequent recommended parameter types and one or more subsequent recommended values for achieving the selected result based on the subsequent training data set; providing the one or more subsequent recommended parameter types and one or more subsequent recommended values to a testing system; receiving, from the testing system, a subsequent result of executing the test script using the one or more subsequent recommended parameter types and the one or more subsequent recommended values; and determining whether the stop condition is reached based on the subsequent result.

Aspect 19: The method of any of Aspects 16-18, wherein the one or more recommended parameter types comprises a selection of one or more of: a typing tempo signature, a mouse movement signature, a maximum test attempt number, a test time window, a geographic place of origin, a web domain, and a web browser type.

Aspect 20: The method of any of Aspects 16-19, wherein the one or more recommended parameter types includes at least one cookie parameter type; and the one or more recommended values include at least one value for the at least one cookie parameter type.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
selecting a subset of parameter types from a universe of test script generator parameter types;
assigning one or more assigned values to the subset of parameter types;
executing a test script, using the subset of parameter types and the one or more assigned values, against a target system to obtain a first result;
generating, using a machine learning model trained based on the subset of parameter types, the one or more assigned values, and the first result, one or more recommended parameter types and one or more recommended values;
executing the test script using the one or more recommended parameter types and one or more recommended values to obtain a second result;
determining whether the second result meets a success threshold; and
based on the second result meeting the success threshold, performing a selection of one or more of: updating a policy, generating an alert, and executing a second test script.

2. The method of claim 1, wherein
determining whether the second result meets the success threshold comprises:
based on the second result not meeting the success threshold, until a result set meets the success threshold or a stop condition is reached, performing between one and n iterations, each iteration comprising:
selecting an additional random subset of parameter types from the universe of parameter types;
assigning one or more additional random values to the additional random subset of parameter types;
executing the test script against the target system using the additional random subset of parameter types and the one or more additional random values to produce an additional first result set;
adding the additional first result set to the first result to produce a first combined result;
generating, using a machine learning model trained based on the first combined result, one or more additional recommended parameter types and one or more additional recommended values;
executing the test script using the one or more additional recommended parameter types and the one or more additional recommended values to obtain an additional second result; and
determining whether the additional second result meets the success threshold.

3. The method of claim 1, wherein:
executing the test script against the target system comprises executing a login request; and
recording the first result of the test script comprises:
recording whether the login request was successful; and
recording metadata associated with the login request.

4. The method of claim 3, wherein the metadata associated with the login request includes a selection at least one of: a request time, a request number, a request origin, calendar information, requesting device information, requesting device connection type, browser information, velocity parameters, reputation parameters, a time period request number, an IP address request number, a failure ratio, and a cookie contents.

5. The method of claim 1, wherein the target system is an access controlled system and executing the test script comprises:
executing a request for a feature of the access controlled system;
detecting a restriction from the feature of the access controlled system; and
recording metadata associated with the request for the feature in a result of the test script.

6. The method of claim 5, further comprising, based on the second result:
triggering an adjustment of an access control policy of the access controlled system, the adjustment comprising a change in access related to the subset of parameter types and the one or more assigned values.

7. The method of claim 1, wherein executing the test script using the subset of parameter types and the one or more assigned values comprises:
executing the test script against the target system a number of times over a period of time using a plurality of avatars having randomly selected parameter types and randomly assigned values to generate the first result, the randomly selected parameter types comprising a plurality of attribute types associated with a possible user of the target system.

8. A system, comprising:
a memory having executable instructions stored thereon; and
one or more processors configured to execute the executable instructions to cause the system to:
select a subset of parameter types from a universe of test script generator parameter types;
assign one or more assigned values to the subset of parameter types;
execute a test script, using the subset of parameter types and the one or more assigned values, against a target system to obtain a first result;
generate, using a machine learning model trained based on the subset of parameter types, the one or more assigned values, and the first result, one or more recommended parameter types and one or more recommended values;
execute the test script using the one or more recommended parameter types and one or more recommended values to obtain a second result; and
trigger an adjustment of an access control policy of an access controlled system based on the second result, the adjustment comprising a change in access related to the subset of parameter types and the one or more assigned values.

9. The system of claim 8, wherein the executable instructions further cause the system to: determine whether to execute one or more actions based on the second result by:
determining whether the second result meets a success threshold; and
based on the second result meeting the success threshold, performing a selection of one or more of: updating a policy, generating an alert, and executing a second test script.

10. The system of claim 8, wherein the executable instructions further cause the system to: determine whether to execute one or more actions based on the second result by:
determining whether the second result meets a success threshold;
based on the second result not meeting the success threshold, until a result set meets the success threshold or a stop condition is reached, perform between one and n iterations, each iteration comprising:
selecting an additional random subset of parameter types from the universe of parameter types;
assigning one or more additional random values to the additional random subset of parameter types;
executing the test script against the target system using the additional random subset of parameter types and the one or more additional random values to produce an additional first result set;
adding the additional first result set to the first result to produce a first combined result;
generating, using a machine learning model trained based on the first combined result, one or more additional recommended parameter types and one or more additional recommended values;
executing the test script using the one or more additional recommended parameter types and the one or more additional recommended values to obtain an additional second result; and
determining whether the additional second result meets the success threshold.

11. The system of claim 8, wherein the executable instructions further cause the system to:
execute the test script against the target system by executing a login request; and
record the first result of the test script by:
recording whether the login request was successful; and
recording metadata associated with the login request.

12. The system of claim 11, wherein the metadata associated with the login request includes a selection at least one of: a request time, a request number, a request origin, calendar information, requesting device information, requesting device connection type, browser information, velocity parameters, reputation parameters, a time period request number, an IP address request number, a failure ratio, and a cookie contents.

13. The system of claim 8, wherein the target system is an access controlled system and the executable instructions further cause the system to execute the test script by:
executing a request for a feature of the access controlled system;
detecting a restriction from the feature of the access controlled system; and
recording metadata associated with the request for the feature in a result of the test script.

* * * * *